United States Patent
Hwang et al.

(10) Patent No.: US 11,905,431 B2
(45) Date of Patent: Feb. 20, 2024

(54) POLYIMIDE VARNISH COMPRISING AROMATIC CARBOXYLIC ACID FOR CONDUCTOR COATING AND MANUFACTURING METHOD THEREFOR

(71) Applicant: PI ADVANCED MATERIALS CO., LTD., Chungcheongbuk-do (KR)

(72) Inventors: In Hwan Hwang, Seoul (KR); Ik Sang Lee, Gyeongsangbuk-do (KR); Jeong Yeul Choi, Gyeonggi-do (KR)

(73) Assignee: PI ADVANCED MATERIALS CO., LTD., Chungcheongbuk-do (KR)

( * ) Notice: Subject to any disclaimer, the term of this patent is extended or adjusted under 35 U.S.C. 154(b) by 594 days.

(21) Appl. No.: 17/270,006

(22) PCT Filed: Nov. 13, 2018

(86) PCT No.: PCT/KR2018/013804
§ 371 (c)(1),
(2) Date: Feb. 20, 2021

(87) PCT Pub. No.: WO2020/040356
PCT Pub. Date: Feb. 27, 2020

(65) Prior Publication Data
US 2021/0198521 A1  Jul. 1, 2021

(30) Foreign Application Priority Data

Aug. 22, 2018 (KR) .......... 10-2018-0097929
Oct. 25, 2018 (KR) .......... 10-2018-0128186

(51) Int. Cl.
*C09D 179/08* (2006.01)
*H01B 3/30* (2006.01)
*H01B 13/06* (2006.01)
*C08K 5/092* (2006.01)
*C08K 5/521* (2006.01)

(52) U.S. Cl.
CPC .......... *C09D 179/08* (2013.01); *C08K 5/092* (2013.01); *H01B 3/306* (2013.01); *H01B 13/06* (2013.01); *C08K 5/521* (2013.01)

(58) Field of Classification Search
CPC ...... C09D 179/08; H01B 3/306; C08K 5/092; C08K 5/521; C08L 79/08
See application file for complete search history.

(56) References Cited

U.S. PATENT DOCUMENTS

2012/0247806 A1  10/2012  Choi et al.

FOREIGN PATENT DOCUMENTS

| JP | 09-291093 A | 11/1997 |
| JP | 2000044800 A | 2/2000 |
| JP | 2008-120869 A | 5/2008 |
| JP | 2010-001412 A | 1/2010 |
| JP | 2010001412 A * | 1/2010 |
| JP | 2016044288 A * | 4/2016 |
| JP | 2016191029 A * | 11/2016 |
| JP | 2017036373 A * | 2/2017 |
| JP | 2018-115272 A | 7/2018 |
| KR | 10-2012-0111255 A | 10/2012 |

OTHER PUBLICATIONS

Machine translation of JP-2010001412-A (2010, 12 pages).*
Machine translation of JP-2016044288-A (2016, 10 pages).*
Machine translation of JP-2016191029-A (2016, 15 pages).*
Machine translation of JP-2017036373-A (2017, 16 pages).*

* cited by examiner

*Primary Examiner* — Brieann R Johnston
(74) *Attorney, Agent, or Firm* — Hammer & Associates, P.C.

(57) ABSTRACT

The present invention is a polyimide varnish for conductor coating, which provides a polyimide varnish comprising: a polyamic acid solution prepared through polymerization of at least one dianhydride monomer and at least one diamine monomer in an organic solvent; an aromatic carboxylic acid having four or more carboxyl groups; an alkoxy silane coupling agent; and an antioxidant, wherein the polyimide varnish has a solid content of 15 to 38 wt % on the basis of the total weight thereof, and a viscosity at 23° C. of 500 to 9,000 cP, and the coated material prepared from the polyimide varnish has a degree of softening resistance of 520° C. or higher, and a breakdown voltage (BDV) of 8 kV/mm or higher.

22 Claims, No Drawings

POLYIMIDE VARNISH COMPRISING AROMATIC CARBOXYLIC ACID FOR CONDUCTOR COATING AND MANUFACTURING METHOD THEREFOR

TECHNICAL FIELD

The present invention relates to a polyimide varnish for conductor coating comprising an aromatic carboxylic acid and a manufacturing method therefor.

BACKGROUND ART

An insulating layer (insulation coating) coating a conductor is required to have excellent insulation properties, adhesion to the conductor, heat resistance, mechanical strength, and the like.

Furthermore, in an electric device having a high applied voltage, such as a motor used at a high voltage, the high voltage is applied to insulated wires constituting the electric device, whereby a partial discharge (corona discharge) is liable to occur on the insulating coating surface thereof.

The occurrence of corona discharge may cause a local temperature increase or generation of ozone or ions, resulting in deterioration in the insulation coating of the insulated wires, thereby causing early insulation breakdown and shortening the life of the electric device.

Insulated wires used at high voltages are required to increase the corona discharge initiation voltage for the above reasons, and for this purpose, it is known that it is effective to lower the dielectric constant of the insulating layer.

Resins usable for the insulating layer may be exemplified by polyimide resins, polyamideimide resins, polyesterimide resins, and the like.

Among these, in particular, the polyimide resin is a material having excellent heat resistance and insulation properties, which has excellent properties for use as a material for coating a conductor.

The polyimide resin refers to a high heat-resistant resin prepared by solution-polymerizing an aromatic dianhydride and an aromatic diamine or an aromatic diisocyanate to prepare a polyamic acid derivative, followed by ring-closure dehydration at high temperature and imidization.

In order to use the polyimide resin as a material for insulation coating, it is necessary to further improve heat resistance, insulation properties and mechanical properties, and for this purpose, a method of increasing the molecular weight of the polyimide resin may be considered.

The more the imide groups are in the molecule, the heat resistance, insulation properties and mechanical properties of the polyimide resin can be more improved, and the longer the polymer chain is, the ratio of the imide group increases higher, so that the reason is because it is advantageous for securing physical properties to prepare polyimides having high molecular weights.

In order to prepare a polyimide having a high molecular weight, it is common that a polyamic acid, which is its precursor, is prepared to have a high molecular weight and then subjected to imidization through heat treatment.

However, the higher the molecular weight of the polyamic acid, the higher the viscosity of the varnish in a state where the polyamic acid is dissolved in a solvent, so that there may be a problem that it is not easy to uniformly coat the varnish on the conductor surface, and the thickness of the resulting coating is too thick.

In order to lower the viscosity of the varnish while maintaining the molecular weight of the polyamic acid, a method of lowering the solid content and increasing the solvent content may be considered, but in this case, as a large amount of solvent must be removed during the curing process, there may be a problem that manufacturing cost and process time increase.

Meanwhile, in general, polyimide resins cause chemical changes, that is, oxidation reaction by light, heat, pressure, shear force, and the like, in the presence of oxygen. This oxidation reaction causes changes in physical properties due to cleavage or crosslinking of the molecular chains in the polyimide resin or the like, thereby causing a problem of lowering the heat resistance and mechanical properties of the produced polyimide resin.

In order to solve this problem, a method of introducing a small amount of additive such as an antioxidant is used, where the antioxidant serves to stabilize the polyimide resin, for example, by removing oxygen atoms of the polyimide resin that has already been oxidized, in which phosphate compounds and sulfur compounds are typically used.

However, in the case of generally used antioxidants, they have a property of decomposing at high temperatures, and in particular, when the polyimide resin is produced, high temperature heat treatment for imidization is generally accompanied, and thus at this time, the antioxidant is decomposed, whereby there is a problem that the effect of inhibited oxidation is reduced or in some cases, such an effect is not exhibited at all.

Meanwhile, as a method of forming an insulation coating using a polyimide resin, for example, a method of applying a polyimide varnish, which is a precursor of a polyimide resin, around an electric wire made of a conductor, and then imidizing the polyimide varnish in a curing furnace capable of heat-treatment at a predetermined temperature may be used.

However, general polyimide resins do not have excellent adhesion force to the conductor despite their excellent physical properties, so that there may be a problem that appearance defects occur when forming the insulation coating.

Therefore, there is a high need for a polyimide varnish for conductor coating having excellent adhesion force with a conductor while maintaining a low viscosity, even if the solid content of the varnish is high, and simultaneously satisfying heat resistance, insulation properties and mechanical properties of the polyimide prepared therefrom.

DISCLOSURE

Technical Problem

It is an object of the present invention to provide a polyimide varnish for conductor coating comprising an aromatic carboxylic acid having four or more carboxyl groups, and a manufacturing method therefor.

According to an aspect of the present invention, the aromatic carboxylic acid having four or more carboxyl groups is disclosed as an essential factor for implementation of a polyimide coated material having excellent heat resistance, insulation properties, flexibility and adhesion with a base material (conductor).

The aromatic carboxylic acid constituting the polyimide varnish reacts with the terminal amine group of a polyamic acid chain or a polyimide chain during heat treatment for imidization to increase the polymer chain length, which may improve heat resistance, insulation properties, flexibility and adhesion with a base material of the polyimide coated material thus produced.

The polyimide coated material according to the present invention increases the molecular weight of the polyimide during heat treatment for imidization, so that even if the polyimide varnish, which is a precursor thereof, has a high solid content, the viscosity can be kept low, whereby process handleability can be significantly improved.

According to another aspect of the present invention, an antioxidant having a 5 wt % decomposition temperature of 380° C. or higher is disclosed as an essential factor in the implementation of a polyimide coated material having excellent heat resistance and mechanical properties.

Since the antioxidant constituting the polyimide varnish has low volatility and excellent thermal stability, it is maintained without being decomposed or volatilized during the manufacturing process of the polyimide coated material, whereby the oxidation of the amide group in the polyimide varnish or the imide group of the polyimide coated material can be prevented. Accordingly, the antioxidant can minimize changes in physical properties of the polyimide coated material.

According to another aspect of the present invention, a silicone-based additive and an alkoxy silane coupling agent may be utilized as an adhesion promoter between a polyimide coated material prepared from the polyimide varnish and a conductor to increase adhesion force.

Accordingly, it is a practical object of the present invention to provide specific examples thereof.

Technical Solution

The present invention is a polyimide varnish for conductor coating, which provides
a polyimide varnish comprising: a polyamic acid solution prepared through polymerization of at least one dianhydride monomer and at least one diamine monomer in an organic solvent;
an aromatic carboxylic acid having four or more carboxyl groups:
an alkoxy silane coupling agent; and
an antioxidant,
wherein the polyimide varnish has a solid content of 15 to 38 wt/u on the basis of the total weight thereof, and
a viscosity at 23° C. of 500 to 9,000 cP, and
the coated material prepared from the polyimide varnish has a degree of softening resistance of 520° C. or higher, and a breakdown voltage (BDV) of 8 kV/mm or higher.

When using the polyimide varnish, process handleability is improved because it has the relatively low viscosity with having the high solid content, so that the polyimide coated material can be uniformly coated on the conductor, as well as the thickness of the coated material can be easily adjusted.

In addition, it has been found that the polyimide coated material prepared therefrom has excellent heat resistance and insulation properties, and flexibility of the coating and adhesiveness with the base material are improved.

Therefore, details for its implementation will be described in this specification.

Prior to this, the terms or words used in this specification and claims should not be construed as being limited to usual or dictionary meanings, and should be interpreted as meanings and concepts consistent with the technical idea of the present invention based on the principle that the inventors can appropriately define the concepts of the terms in order to explain their own invention in the best way.

Therefore, the constitution of the examples described in this specification is only one of the most preferred examples of the present invention and does not represent all the technical idea of the present invention, so that it should be understood that various equivalents and variation examples capable of replacing them at the time of filing the present application may exist.

In this specification, expressions in singular include expressions in plural, unless the contexts clearly indicate otherwise. In this specification, the term such as "comprise," "possess" or "have" is intended to designate the presence of implemented features, numbers, steps, components or combinations thereof, and it should be understood that the presence or addition possibility of one or more other features or numbers, steps, components or combinations thereof is not excluded in advance.

In this specification, the "dianhydrides" are intended to include precursors or derivatives thereof, which may be not dianhydrides technically, but will nevertheless react with diamines to form polyamic acids, where these polyamic acids can be converted back to polyimides.

In this specification, the "diamines" are intended to include precursors or derivatives thereof, which may not be diamines technically, but will nevertheless react with dianhydrides to form polyamic acids, where these polyamic acids can be converted back to polyimides.

When amounts, concentrations, or other values or parameters herein are given as enumeration of ranges, preferred ranges or preferred upper limits and preferred lower limits, it should be understood that all the ranges formed by any one pair of any upper range limits or preferred values and any lower range limits or preferred values are disclosed, regardless of whether the ranges are disclosed separately.

When a range of numerical values is mentioned herein, the range is intended to include its endpoints and all integers and fractions within the range, unless otherwise stated.

The scope of the present invention is intended to be not limited to the specific values mentioned when defining the range.

First Aspect: Polyimide Varnish

The polyimide varnish according to the present invention is a polyimide varnish for conductor coating,
which comprises: a polyamic acid solution prepared through polymerization of at least one dianhydride monomer and at least one diamine monomer in an organic solvent;
an aromatic carboxylic acid having four or more carboxyl groups;
an alkoxy silane coupling agent; and
an antioxidant, and
which is characterized in that the polyimide varnish has a solid content of 15 to 38 wt % on the basis of the total weight thereof, and
a viscosity at 23° C. of 500 to 9,000 cP, and
the coated material prepared from the polyimide varnish has a degree of softening resistance of 520° C. or higher, and a breakdown voltage (BDV) of 8 kV/mm or higher.

Specifically, the polyimide varnish may have a solid content of 18 to 38 wt % based on the total weight of the polyimide varnish, and a viscosity at 23° C. in a range of 500 to 8,000 cP, more specifically in a range of 500 to 5,000 cP.

In one specific example, the coated material made from the polyimide varnish may have a degree of softening resistance from 520° C. or higher to 900° C. or lower, and a breakdown voltage (BDV) from 8 kV/mm or higher to 16 kV/mm or lower.

When the solid content of the polyimide varnish exceeds the above range, it is not preferable because it is inevitable that the viscosity of the polyimide varnish increases.

Conversely, when the solid content of the polyimide varnish is below the above range, a problem of increasing manufacturing cost and processing time may occur as a large amount of solvent must be removed during the curing process.

In addition, the polyimide varnish having the viscosity has an advantage of being easy to handle in terms of fluidity, and may also be advantageous in a process of coating a conductor surface.

Specifically, when the viscosity of the polyimide varnish exceeds the above range, at the time of moving the polyimide varnish through a pipe during the polyimide manufacturing process, a higher pressure must be applied thereto due to friction with the pipe, so that the process cost may increase and the handleability may decrease.

In addition, it may be difficult to uniformly coat a conductor when manufacturing a polyimide coated material.

On the other hand, when the viscosity of the polyimide varnish is below the above range, a problem of increasing manufacturing cost and processing time may occur as a large amount of solvent must be removed during the curing process.

Meanwhile, the aromatic carboxylic acid may comprise one or more selected from the group consisting of pyromellitic acid (PMA), 3,3',4,4'-biphenyltetracarboxylic acid (BPTA), 1,2,3,4-benzenetetracarboxylic acid, benzophenone-3,3',4,4'-tetracarboxylic acid, pyrazinetetracarboxylic acid, 2,3,6,7-naphthalenetetracarboxylic acid and naphthalene-1,4,5,8-tetracarboxylic acid.

In the present invention, the aromatic carboxylic acid having four or more carboxyl groups is not polymerized to the polyamic acid at a temperature in the process of polymerizing a polyamic acid solution or preparing a polyimide varnish, for example, a temperature of 40 to 90° C., but then causes, upon the heat treatment for imidization, a ring-closure dehydration reaction, whereby the carboxyl group may form a dianhydride group.

When the aromatic carboxyl group forms a dianhydride group, the dianhydride group reacts with the terminal amine group of the polyamic acid chain or the polyimide chain, whereby the polymer chain length can be increased while forming an amic acid group.

The resulting amic acid group may be imidized at a high temperature, thereby increasing the length of the polyimide chain.

As described above, the polyimide varnish comprising the aromatic carboxylic acid can maintain a low viscosity, so that process handleability can be remarkably improved. In addition, upon the heat treatment for imidization, the length of the polymer chain is increased, whereby heat resistance, insulation properties, flexibility and adhesion with a base material may be remarkably improved as compared to the polyimide prepared using a polyamic acid having a similar molecular weight.

Based on 100 mol % of the diamine monomer, an input of the dianhydride monomer may be 80 to 99.9 mol %, and an input of the aromatic carboxylic acid may be 0.1 to 20 mol %.

When the input of the aromatic carboxylic acid exceeds the above range, the heat resistance of the polyimide coated material may be lowered and the flexibility may be lowered to cause defects in the appearance of the coating, and when it is below the above range, it is not preferable because the desired level of low viscosity cannot be achieved.

Meanwhile, 0.01 to 0.05 parts by weight of an alkoxy silane coupling agent may be included relative to 100 parts by weight of the solid content of the polyimide varnish.

When the content of the alkoxysilane coupling agent exceeds the above range, mechanical properties may be lowered, and the alkoxysilane coupling agent may be decomposed at high temperatures upon heat treatment for imidization to lower adhesion force between the polyimide coated material and the conductor rather, so that it is not preferable.

On the other hand, when the content of the alkoxysilane coupling agent is below the above range, it is not preferable because the effect of improving adhesion force between the polyimide coated material and the conductor cannot be sufficiently exhibited.

The alkoxy silane coupling agent may comprise one or more selected from the group consisting of, for example, 3-aminopropyl trimethoxysilane, 3-aminopropyl triethoxysilane, 3-aminopropyl methyl dimethoxysilane, 3-aminopropyl methyl diethoxysilane, 3-(2-aminoethyl) aminopropyl trimethoxysilane, 3-phenylaminopropyl trimethoxysilane, 2-aminophenyl trimethoxysilane, and 3-aminophenyl trimethoxysilane, but is not limited thereto.

Meanwhile, the antioxidant may have a 5 wt % decomposition temperature of 380° C. or higher, specifically, a 5 wt % decomposition temperature of 400° C. or higher.

Specifically, the antioxidant may comprise a compound represented by the following formula 1.

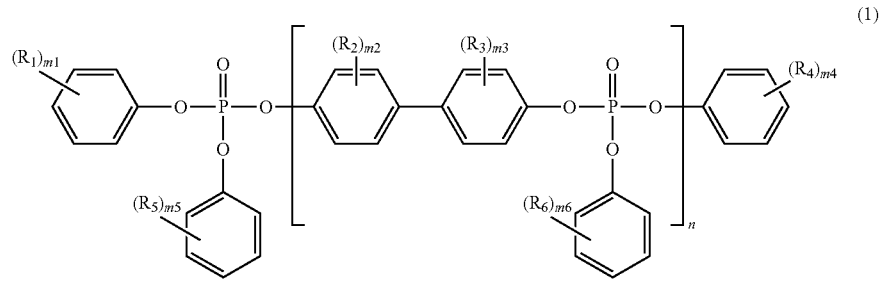

(1)

In Formula 1 above. $R_1$ to $R_6$ may each independently be selected from the group consisting of a C1-C3 alkyl group, an aryl group, a carboxylic acid group, a hydroxy group, a fluoroalkyl group and a sulfonic acid group, n is an integer of 1 to 4, when $R_1$ to $R_6$ are in plural, they may be the same or different from each other, and m1 to m6 are each independently an integer of 0 to 3.

When the substituent of the benzene ring in Formula 1 above is not specifically designated, it means hydrogen.

In one specific example, in Formula 1, n may be 1, m1 to m6 may be 0, and more specifically, the antioxidant may be a compound of Formula 1-1 below.

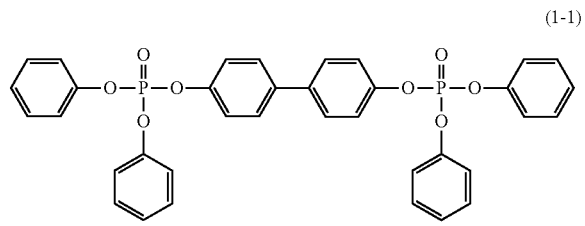 [SMILES: O=P(Oc1ccccc1)(Oc1ccccc1)Oc1ccc(-c2ccc(OP(=O)(Oc3ccccc3)Oc3ccccc3)cc2)cc1]

(1-1)

Since such an antioxidant has low volatility and excellent thermal stability, it is not decomposed or volatilized during the manufacturing process of the polyimide coated material, whereby the effect of preventing oxidation of the amide group in the polyimide varnish or the imide group of the polyimide coated material can be exhibited.

Conversely, in the case of an antioxidant having a 5 wt % decomposition temperature of 380° C. or lower, it is decomposed by the high temperature during the manufacturing process of the polyimide coated material, whereby the effect according to the input of such an antioxidant cannot be exhibited.

The antioxidant may be included in a range of 0.1 to 2 parts by weight relative to 100 parts by weight of the solid content of the polyimide varnish.

When the content of such an antioxidant exceeds the above range, it is not preferable because a deposition or blooming phenomenon occurs in the polyimide coated material, so that mechanical properties may be rather reduced, and defects may occur in the appearance of the coated material.

Conversely, when the content of the antioxidant is below the above range, it is not preferable because the effect of inhibited oxidation cannot be sufficiently exhibited.

In the present invention, the polyimide varnish may further comprise a silicone-based additive.

Specifically, 0.01 to 0.05 parts by weight of a silicone-based additive may be included relative to 100 parts by weight of the solid content of the polyimide varnish.

When the content of such a silicone-based additive exceeds the above range, it is not preferable because the mechanical properties of the polyimide coated material to be prepared may be lowered, and the silicone-based additive is decomposed at high temperatures upon heat treatment for imidization, so that the adhesion force between the polyimide coated material and the conductor may be rather lowered.

On the other hand, when the content of the silicone-based additive is below the above range, it is not preferable because the effect of improving the adhesion force between the polyimide coated material and the conductor cannot be sufficiently exhibited.

The silicone-based additive may comprise one or more selected from the group consisting of, for example, dimethylpolysiloxane, polyether modified polydimethysiloxane, polymethylalkylsiloxane, and a silicone-based additive containing a hydroxyl group (—OH) and a double bond structure (C=C), but is not limited thereto.

Meanwhile, as described above, the polyamic acid solution may be produced by a polymerization reaction of at least one dianhydride monomer and at least one diamine monomer.

The dianhydride monomer that can be used in the production of the polyamic acid of the present invention may be an aromatic tetracarboxylic dianhydride.

The aromatic tetracarboxylic dianhydride may be exemplified by pyromellitic dianhydride (or PMDA), 3,3',4,4'-biphenyltetracarboxylic dianhydride (or BPDA), 2,3,3',4'-biphenyltetracarboxylic dianhydride (or a-BPDA), oxydiphthalic dianhydride (or ODPA), diphenylsulfone-3,4,3',4'-tetracarboxylic dianhydride (or DSDA), bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride Ride (or BTDA), bis(3,4-dicarboxyphenyl)methane dianhydride, 2,2-bis(3,4-dicarboxyphenyl)propane dianhydride, p-phenylenebis (trimellitic monoester acid anhydride), p-biphenylenebis (trimelitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy) benzene dianhydride, 1,4-bis(3,4-dicarboxyphenoxy) benzene dianhydride, 1,4-bis(3,4-dicarboxyphenoxy) biphenyl dianhydride, 2,2-bis[(3,4-dicarboxyphenoxy) phenyl]propane dianhydride (BPADA), 2,3,6,7-naphthalenetetracarboxylic acid dianhydride, 1,4,5,8-naphthalenetetracarboxylic dianhydride, 4,4'-(2,2-hexafluoroisopropylidene)diphthalic acid dianhydride, and the like. These can be used alone or in combination of two or more as desired.

These may be used alone or in combination of two or more as desired, but the dianhydride monomer that can be particularly preferably used in the present invention may further comprise one or more selected from the group consisting of pyromellitic dianhydride (PMDA), 3,3',4,4'-benzophenonetetracarboxylic dianhydride (BTDA), 2,3,3',4'-biphenyltetracarboxylic dianhydride, 1H,3H-naphtho[2,3-c:6,7-c']difuran-1,3,6,8-tetrone 2,3,6,7-naphthalenetetracarboxylic dianhydride, 1,4,5,8-naphthalenetetracarboxylic dianhydride, 4,4'-oxydiphthalic anhydride, 4,4'-oxybis (2-benzofuran-1,3-dione), 4-[(1,3-dioxo-1,3-dihydro-2-benzofuran-5-yl)oxy]-2-benzofuran-1,3-dione and 5,5'-sulfonylbis-1,3-isobenzofurandione.

The diamine monomer that can be used in the preparation of the polyamic acid solution of the present invention is an aromatic diamine, which may include example as classified as follows.

1) a diamine with a relatively rigid structure, as a diamine having one benzene nucleus in structure, such as 1,4-diaminobenzene (or paraphenylenediamine, PDA), 1,3-diaminobenzene, 2,4-diaminotoluene, 2,6-diaminotoluene and 3,5-diaminobenzoic acid (or DABA);

2) a diamine having two benzene nuclei in structure, such as a diaminodiphenyl ether of 4,4'-diaminodiphenyl ether (or oxydianiline, ODA), 3,4'-diaminodiphenyl ether, and the like, 4,4'-diaminodiphenylmethane (methylenediamine), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dichlorobenzidine, 3,3'-dimethylbenzidine (or o-tolidine), 2,2'-dimethylbenzidine (or m-tolidine), 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenylsulfoxide, 3,4'-diaminodiphenylsulfoxide and 4,4'-diaminodiphenylsulfoxide;

3) a diamine having three benzene nuclei in structure, such as 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene (or TPE-Q), 1,4-bis(4-aminophenoxy)benzene (or TPE-Q), 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropylbenzene and 1,4-bis[2-(4-aminophenyl)isopropyl]benzene;

4) a diamine having four benzene nuclei in structure, such as 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl] ether, bis[4-(3-aminophenoxy)phenyl] ether, bis[4-(4-aminophenoxy)phenyl] ether, bis[3-(3-aminophenoxy)phenyl] ketone, bis[3-(4-aminophenoxy)phenyl] ketone, bis[4-(3-aminophenoxy)phenyl] ketone, bis[4-(4-aminophenoxy)phenyl] ketone, bis[3-(3-aminophenoxy)phenyl] sulfide, bis[3-(4-aminophenoxy)phenyl] sulfide, bis[4-(3-aminophenoxy)phenyl] sulfide, bis[4-(4-aminophenoxy)phenyl] sulfide, bis[3-(3-aminophenoxy)phenyl] sulfone, bis[3-(4-aminophenoxy)phenyl] sulfone, bis[4-(3-aminophenoxy)phenyl] sulfone, bis[4-(4-aminophenoxy)phenyl] sulfone, bis[3-(3-aminophenoxy)phenyl) methane, bis[3-(4-aminophenoxy)phenyl) methane, bis[4-(3-aminophenoxy)phenyl] methane, bis[4-(4-aminophenoxy)phenyl] methane, 2,2-bis[3-(3-aminophenoxy)phenyl] propane, 2,2-bis[3-(4-aminophenoxy)phenyl] propane, 2,2-bis[4-(3-aminophenoxy)phenyl]propane, 2,2-bis[4-(4-aminophenoxy)phenyl]propane (BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane and 2,2-bis[4-(4-aminophenoxy)phenyl]-1,1,1,3,3,3-hexafluoropropane.

These can be used alone or in combination of two or more as desired, but the diamine monomer that can be particularly preferably used in the present invention may be one or more selected from the group consisting of para-phenylene diamine (p-PDA), diaminophenyl ether, o-phenylenediamine, m-phenylenediamine, 2,6-diamino-pyridine, 4,4'-diaminodiphenylsulfone, 2-(4-aminophenyl)-1H-benzoxazole-5-amine, 2-(4-aminophenyl)-5-aminobenzimidazole, 6-amino-2-(p-aminophenyl)benzoxazole and 4,4"-diamino-p-terphenyl.

Second Aspect: Method for Producing Polyimide Varnish

The method for producing a polyimide varnish according to the present invention may comprise processes of:

(a) polymerizing at least one dianhydride monomer and at least one diamine monomer in an organic solvent to prepare a polyamic acid solution;

(b) mixing an alkoxy silane coupling agent and an antioxidant in the polyamic acid solution to prepare a mixture; and (c) mixing the mixture and an aromatic carboxylic acid having four or more carboxyl groups.

In the present invention, the preparation of the polyamic acid solution may include:

(1) a method of introducing the total amount of the diamine monomer into the solvent, and then adding the dianhydride monomer so as to be substantially equimolar with the diamine monomer to polymerize them;

(2) a method of introducing the total amount of the dianhydride monomer into the solvent, and then adding the diamine monomer so as to be substantially equimolar with the dianhydride monomer to polymerize them;

(3) a method of introducing some components of the diamine monomer into the solvent, and then mixing some components of the dianhydride monomer in a ratio of about 80 to 120 mol % relative to the reaction components, and subsequently adding the remaining diamine monomer components thereto and successively adding the remaining dianhydride monomer components thereto to polymerize the diamine monomer and the dianhydride monomer so that they become substantially equimolar;

(4) a method of introducing the dianhydride monomer into the solvent, and then mixing some components of the diamine compound in a ratio of 90 to 110 mol % relative to the reaction components, and subsequently adding the other dianhydride monomer component thereto and successively adding the remaining diamine components thereto to polymerize the diamine monomer and the dianhydride monomer so that they become substantially equimolar;

(5) a method of reacting some diamine monomer components and some dianhydride monomer components in the solvent so that any one is in excess to form a first composition, and reacting some diamine monomer components and some dianhydride monomer components in another solvent so that any one is in excess to form a second composition, and then mixing the first and second compositions, and completing the polymerization, wherein when the diamine monomer component is in excess at the time of forming the first composition, the dianhydride monomer component in the second composition is in excess, and when the dianhydride monomer component in the first composition is in excess, the diamine monomer component in the second composition is in excess, thereby mixing the first and second compositions to polymerize all of the diamine monomer component and the dianhydride monomer component used in the reaction so that they become substantially equimolar, and the like.

The organic solvent is not particularly limited as long as it is a solvent that the polyamic acid can be dissolved, but as one example, it may be an aprotic polar solvent.

A non-limiting example of the aprotic polar solvent may include an amide-based solvent such as N,N'-dimethylformamide (DMF) and N,N'-dimethylacetamide (DMAc), a phenolic solvent such as p-chlorophenol and o-chlorophenol, N-methyl-pyrrolidone (NMP), gamma butyrolactone (GBL) and Diglyme, and the like, where these can be used alone or in combination of two or more.

In some cases, the solubility of the polyamic acid may also be adjusted using an auxiliary solvent such as xylene, toluene, tetrahydrofuran, acetone, methyl ethyl ketone, methanol, ethanol, and water.

In one example, the organic solvent that can be particularly preferably used for preparing the polyimide varnish of the present invention may be N,N'-dimethylformamide and N,N'-dimethylacetamide, which are amide-based solvents.

The polymerization method is not limited to only the above examples, and any known method may also be used.

The dianhydride monomer may be appropriately selected from the above-described examples, and in detail, may further comprise one or more selected from the group consisting of pyromellitic dianhydride (PMDA), 3,3',4,4'-benzophenonetetracarboxylic dianhydride (BTDA), 2,3,3',4'-biphenyltetracarboxylic dianhydride, 1H,3H-naphtho[2,3-c:6,7-c']difuran-1,3,6,8-tetrone 2,3,6,7-naphthalenetetracarboxylic dianhydride, 1,4,5,8-naphthalenetetracarboxylic dianhydride, 4,4'-oxydiphthalic anhydride, 4,4'-oxybis(2-benzofurane-1,3-dione), 4-[(1,3-dioxo-1,3-dihydro-2-benzofuran-5-yl)oxy]-2-benzofuran-1,3-dione and 5,5'-sulfonylbis-1,3-isobenzofurandione.

The diamine monomer may be appropriately selected from the above-described examples, and in detail, one or more selected from the group consisting of para-phenylene diamine (p-PDA), diaminophenyl ether, o-phenylenediamine, m-phenylenediamine, 2,6-diamino-pyridine, 4,4'-diaminodiphenyl sulphone, 2-(4-aminophenyl)-1H-benzoxazole-5-amine, 2-(4-aminophenyl)-5-aminobenzimidazole, 6-amino-2-(p-aminophenyl)benzoxazole and 4,4"-diamino-p-terphenyl may be preferably used.

The process (a) is performed at 30 to 80° C., and
the polyamic acid solution may have a viscosity at 23° C. in a range of 500 to 9.000 cP.

Furthermore, in the process (b), a silicone-based additive may be additionally mixed to the polyamic acid solution, and the process (b) may be performed at 40 to 90° C.

As described above, the aromatic carboxylic acid contained in the polyimide varnish is not polymerized into the polyamic acid in the varnish state, but by increasing the length of the polyimide chain upon subsequent heat treatment for imidization, the process handleability is good due to the low viscosity in the process of coating the polyimide varnish, and the length of the polymer chain is increased in the curing process after coating, so that it is possible to secure heat resistance, insulation properties, flexibility and adhesion with a base material which are similar to those of the polyimide coated material made from the polyamic acid having a higher molecular weight.

In addition, the antioxidant included in the polyimide varnish can minimize the change in physical properties of the polyimide coated material, and the alkoxy silane coupling agent and silicone-based additive included in the polyimide varnish can improve adhesion force between the polyimide coated material and the conductor.

Third Aspect: Method for Preparing Polyimide Coated Material and Polyimide Coated Material The method for producing a polyimide coated material according to the present invention comprises processes of:
(1) coating a polyimide varnish on a conductor surface; and
(2) imidizing the polyimide varnish coated on the conductor surface,
which is characterized in that the processes (1) and (2) are continuously repeated 4 to 20 times and performed.

The thickness that the polyimide varnish is coated per repeat performance of the processes (1) and (2) is 2 to 6 µm, and
the process (2) may be performed at 300 to 750° C.

In addition, the coating speed of the conductor may be 2 to 30 m/min.

The conductor may be a copper wire made of copper or a copper alloy, but a conductor made of another metal material such as a silver wire, or various metal plated wires such as aluminum and tin-plated wires may be included as the conductor.

The cross-sectional shape of the conductor may be a round wire, a rectangular wire, a hexagonal wire, or the like, but is not limited thereto.

In the production method of the present invention, the polyimide coated material may be prepared through a thermal imidization method.

The thermal imidization method is a method of inducing an imidization reaction with a heat source such as hot air or an infrared dryer, excluding a chemical catalyst.

In the thermal imidization method, the polyimide varnish may be heat-treated at a variable temperature in the range of 100 to 750° C. to imidize the amic acid groups present in the polyimide varnish, and heat-treated at particularly, 300 to 750° C., more particularly, 500 to 700° C. to imidize the amic acid groups present in the polyimide varnish.

In particular, the polyimide varnish according to the present invention has a high molecular weight of polyamic acid, so that there is no problem that defects occur on the surface of the polyimide coated material or the polyimide resin is carbonized even upon heat treatment at a high temperature as above, and a high imidization rate can be achieved.

The polyimide coated material of the present invention prepared according to the manufacturing method as above may have a thickness in the range of 16 to 50 m, and tan δ of 250° C. or higher.

The present invention may also provide an electric wire comprising a polyimide coated material prepared by coating and imidizing the polyimide varnish on the electric wire surface, and provide an electronic device comprising the electric wire.

MODE FOR INVENTION

Hereinafter, the action and effect of the invention will be described in more detail through specific examples of the invention. However, these examples are only presented as examples of the invention, and the scope of the invention is not determined thereby.

Hereinafter, the compound names of the abbreviations used in Examples and Comparative Examples are as follows.

Pyromellitic dianhydride: PMDA
Pyromellitic acid: PMA
Oxydianiline: ODA
N-methyl pyrrolidone: NMP

Example 1

Preparation Example 1: Preparation of Polyamic Acid Solution

While nitrogen was injected into a 500 ml reactor equipped with a stirrer and a nitrogen inlet and outlet tube, 364.6 g of NMP was added thereto, the temperature of the reactor was set at 30° C., and then 61.4 g of ODA and 63.5 g of PMDA were added thereto to confirm that they had been completely dissolved.

The temperature was raised to 50° C. under a nitrogen atmosphere, stirring was continued for 120 minutes while heating, and then a polyamic acid solution having a viscosity at 23° C. of 10,000 cP was prepared.

Preparation Example 2: Preparation of Polyimide Varnish

After setting the temperature of the reactor to 50° C. OFS-6011 as an alkoxysilane coupling agent, a compound of Formula 1-1 below having a 5 wt % decomposition temperature of about 402° C. as an antioxidant, and BYK-378 as a silicone-based additive were added in the polyamic acid solution of Preparation Example 1 in a weight ratio of 1:50:1 and stirred slowly for 30 minutes to prepare a mixed liquid containing an alkoxy silane coupling agent, an antioxidant and a silicone-based additive.

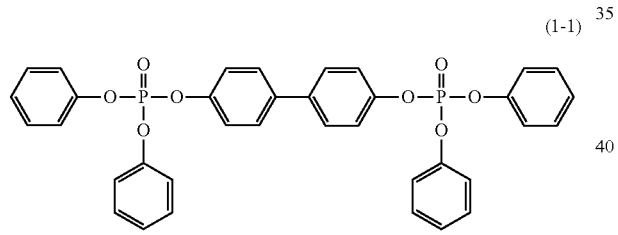

(1-1)

Subsequently, 5 mol of PMA was added thereto relative to 100 mol of ODA after setting the temperature of the reactor to 50° C. The mixture was stirred sufficiently until the reaction was completed, NMP was added so that the total solid content was about 25 wt % and the viscosity was about 3,000 cP, and the polyimide varnish containing 0.01 parts by weight of the alkoxy silane coupling agent, 0.5 parts by weight of the antioxidant and 0.01 parts by weight of the silicone-based additive, relative to 100 parts by weight of the solid content, was prepared, in which the molar ratio of the diamine monomer, the dianhydride monomer and the aromatic carboxylic acid was 100:95:5.

Preparation Example 3: Preparation of Polyimide Coated Material

In a state where the thickness that the polyimide varnish of Preparation Example 2 was coated per time on a copper wire having a conductor diameter of 1 mm in a coating curing furnace was adjusted to a coating thickness from 2 to 6 μm, the maximum temperature of the coating curing furnace was adjusted to 500° C., and the coating speed of the copper wire was adjusted to 12 m/min, the process of coating, drying and curing was repeated seven times in total to prepare an electric wire comprising a polyimide coated material having a coating thickness of 35 sm.

Examples 2 to 10 and Comparative Examples 1 to 12

Electric wires were prepared in the same manner as in Example 1, except that in Example 1, the monomer, the additive, the maximum temperature of the curing furnace, and the solid content and viscosity of the polyimide varnish were changed as shown in Table 1 below.

Comparative Example 13

An electric wire was prepared in the same manner as in Example 1, except that in Example 1, a compound of Formula A below having a 5 wt % decomposition temperature of about 377° C. was added thereto instead of the compound of Formula 1-1 as the antioxidant.

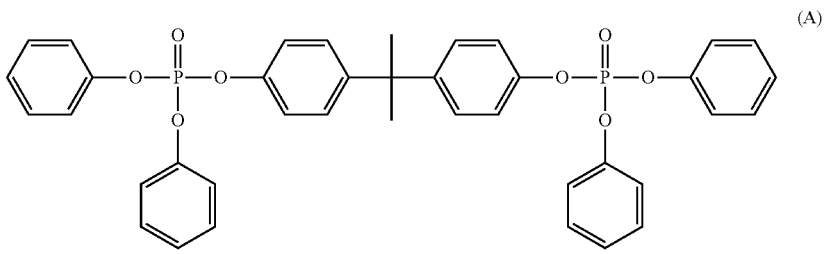

(A)

Comparative Example 14

An electric wire was prepared in the same manner as in Example 1, except that in Example 1, a compound of Formula B below having a 5 wt % decomposition temperature of about 338° C. was added thereto instead of the compound of Formula 1-1 as the antioxidant.

(B)

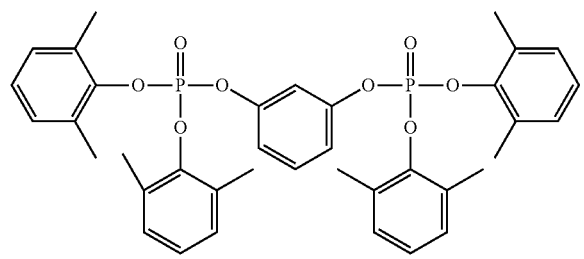

Experimental Example 1: Evaluation of Poor Appearance

By visually observing the appearances of the polyimide coated materials of the electric wires prepared in Examples 1 to 10 and Comparative Examples 1 to 14, it was determined whether or not there were defects, and the results were shown in Table 2 below.

For example, when it was a coated material of a good product, it was represented by 'O,' and when an appearance defect such as a pinhole or that a polyimide resin was carbonized was found, it was represented by 'X.'

TABLE 1

|  |  | ODA (mol %) | PMDA (mol %) | PMA (mol %) | Antioxidant Type | Antioxidant Content (parts by weight) | Coupling agent (parts by weight) | Silicone-based additives (parts by weight) | Maximum temperature of curing furnace (° C.) | Solid content (wt %) | Viscosity (cP) |
|---|---|---|---|---|---|---|---|---|---|---|---|
| Example | 1 | 100 | 95 | 5 | Formula 1-1 | 0.5 | 0.01 | 0.01 | 500 | 25 | 3,000 |
|  | 2 | 100 | 95 | 5 | Formula 1-1 | 0.5 | 0.01 | 0.01 | 550 | 25 | 3,000 |
|  | 3 | 100 | 99.9 | 0.1 | Formula 1-1 | 0.5 | 0.01 | 0.01 | 500 | 25 | 7,000 |
|  | 4 | 100 | 80 | 20 | Formula 1-1 | 0.5 | 0.01 | 0.01 | 500 | 25 | 500 |
|  | 5 | 100 | 95 | 5 | Formula 1-1 | 0.5 | 0.05 | 0.01 | 500 | 25 | 3,000 |
|  | 6 | 100 | 95 | 5 | Formula 1-1 | 0.5 | 0.01 | 0.05 | 500 | 25 | 3,000 |
|  | 7 | 100 | 95 | 5 | Formula 1-1 | 0.1 | 0.01 | 0.01 | 500 | 25 | 3,000 |
|  | 8 | 100 | 95 | 5 | Formula 1-1 | 2 | 0.01 | 0.01 | 500 | 25 | 3,000 |
|  | 9 | 100 | 95 | 5 | Formula 1-1 | 0.5 | 0.01 | 0.01 | 500 | 18 | 2,000 |
|  | 10 | 100 | 95 | 5 | Formula 1-1 | 0.5 | 0.01 | 0.01 | 500 | 38 | 9,000 |
| Comparative Example | 1 | 100 | 100 | — | Formula 1-1 | 0.5 | 0.01 | 0.01 | 500 | 25 | 21,000 |
|  | 2 | 100 | 100 | — | Formula 1-1 | 0.5 | 0.01 | 0.01 | 550 | 25 | 21,000 |
|  | 3 | 100 | 99.95 | 0.05 | Formula 1-1 | 0.5 | 0.01 | 0.01 | 500 | 25 | 8,000 |
|  | 4 | 100 | 75 | 25 | Formula 1-1 | 0.5 | 0.01 | 0.01 | 500 | 25 | 400 |
|  | 5 | 100 | 95 | 5 | Formula 1-1 | 0.5 | 0.01 | 0.01 | 500 | 13 | 3,000 |
|  | 6 | 100 | 95 | 5 | Formula 1-1 | 0.5 | 0.06 | 0.01 | 500 | 25 | 3,000 |
|  | 7 | 100 | 95 | 5 | Formula 1-1 | 0.5 | 0.01 | 0.06 | 500 | 25 | 3,000 |
|  | 8 | 100 | 95 | 5 | Formula 1-1 | 0.5 | — | 0.01 | 500 | 25 | 3,000 |
|  | 9 | 100 | 95 | 5 | Formula 1-1 | 0.5 | 0.01 | — | 500 | 25 | 3,000 |
|  | 10 | 100 | 95 | 5 | Formula 1-1 | 0.01 | 0.01 | 0.01 | 500 | 25 | 3,000 |
|  | 11 | 100 | 95 | 5 | Formula 1-1 | 2.5 | 0.01 | 0.01 | 500 | 25 | 3,000 |
|  | 12 | 100 | 95 | 5 | Formula 1-1 |  | 0.01 | 0,01 | 500 | 25 | 3,000 |
|  | 13 | 100 | 95 | 5 | Formula A | 0.5 | 0.01 | 0.01 | 500 | 25 | 3,000 |
|  | 14 | 100 | 95 | 5 | Formula B | 0.5 | 0.01 | 0,01 | 500 | 25 | 3,000 |

Experimental Example 2: Thermal Shock Resistance Evaluation

Thermal shock resistance was evaluated for the polyimide coated materials of the electric wires prepared in Examples 1 to 10 and Comparative Examples 1 to 14. The thermal shock resistance is an indicator of whether an electric wire can withstand temperature exposure in an extended state or a state wound or bent around a mandrel.

Specifically, in order to evaluate the thermal shock resistance, the polyimide coated materials of the electric wires prepared in Examples 1 to 10 and Comparative Examples 1 to 14 were heated at a temperature of 200° C. for 30 minutes and removed from the oven, and then the specimens were cooled to room temperature, and subsequently, the numbers of cracks in the polyimide coated materials at the time of 20% elongation were determined and the results were shown in Table 2 below.

TABLE 2

|  | Appearance evaluation | Cracks at the time of 20% elongation (ea) |
| --- | --- | --- |
| Example 1 | ○ | No |
| Example 2 | ○ | No |
| Example 3 | ○ | No |
| Example 4 | ○ | No |
| Example 5 | ○ | No |
| Example 6 | ○ | No |
| Example 7 | ○ | No |
| Example 8 | ○ | No |
| Example 9 | ○ | No |
| Example 10 | ○ | No |
| Comparative Example 1 | X | 6 |
| Comparative Example 2 | X | 5 |
| Comparative Example 3 | X | 5 |
| Comparative Example 4 | X | 10 |
| Comparative Example 5 | ○ | 4 |
| Comparative Example 6 | ○ | No |
| Comparative Example 7 | ○ | No |
| Comparative Example 8 | ○ | 3 |
| Comparative Example 9 | ○ | 3 |
| Comparative Example 10 | ○ | 2 |
| Comparative Example 11 | X | 5 |
| Comparative Example 12 | ○ | 3 |
| Comparative Example 13 | ○ | No |
| Comparative Example 14 | ○ | No |

From the results of Table 2, it can be seen that in the case of Comparative Examples 1 to 4 using PMA so as to deviate from the scope of the present invention, Comparative Example 5 in which the solid content is below the scope of the present invention and Comparative Examples 6 to 12 in which at least one of the antioxidant, the silicone-based additive and then alkoxy silane coupling agent is included so as to deviate from the scope of the present invention, the coatings of the polymide coated materials are not uniform or partially carbonized, and are vulnerable to thermal shock resistance.

Experimental Example 3: Evaluation of Physical Properties

The physical properties of the polyimide coated materials of the electric wires prepared in Examples 1 to 10 and Comparative Examples 1 to 14 were measured using the following methods, and the results were shown in Table 3 below.

(1) Tan δ Value

The tan δ value of the polyimide coated material was measured using a DSE TD300 Tan Delta Tester.

Specifically, the specimen is connected to the bridge with the conductor as one electrode and the graphite coating as the other electrode, and the temperature of the assembly is increased at a constant rate from ambient temperature to a temperature that provides a clearly defined curve. The temperatures were taken through a detector in contact with the sample, the results were plotted as a graph of a linear axis for temperature and a logarithmic or linear axis for tan δ, and the tan δ value of the polyimide coated material was calculated from the values.

(2) Degree of Softening Resistance

The degree of softening resistance represents a decomposition temperature of an insulator, which is determined by measuring the temperature that a short circuit occurs between two electric wires crossing each other at a right angle in a state where a specified load is applied to the crossing point.

Specifically, in a state where the wires were overlapped so as to intersect at a right angle and placed on a flat plate and a load of 1000 g was applied to the overlapped portion, an alternating voltage of 100 V was applied and the temperature was increased at a rate of about 2° C./min, thereby measuring the short-circuiting temperature.

(3) Breakdown Voltage (BDV)

A specimen is pretreated in an oven at 150° C. for 4 hours and then placed in a pressure vessel. The pressure vessel is filled with 1400 g of a refrigerant, the pressure vessel is heated for 72 hours, and then the pressure vessel is cooled, and the specimen is transferred to an oven at 150° C., held for 10 minutes, and cooled to room temperature. BDV was measured by connecting both ends of the electric wires and increasing the test voltage (alternating voltage of 60 Hz nominal frequency) between the electric wire conductors from 0 at a constant rate.

(4) Pinhole Test

A pinhole test was performed in order to check whether or not any defect of an insulator exists for a polyimide coated material of an electric wire. Specifically, an electric wire specimen with a length of about 1.5 m was taken and placed in an air circulation oven (125° C.) for 10 minutes, and then cooled at room temperature without any bending or stretching. The cooled electric wire specimen was immersed in a sodium chloride electrolyte, to which phenolphthalein alcohol was added, in a state connected to an electric circuit having a DC test voltage, and then taken out, and the number of pinholes was visually checked.

Experimental Example 4: Pull Test

For the polyimide coated materials of the electric wires prepared in Examples 1 to 10 and Comparative Examples 1 to 14, a pull test was performed to check adhesion force between the conductor and the coated material, and the results were shown in Table 3 below.

Specifically, a straight electric wire specimen with a free measuring length of 200 to 250 mm is quickly stretched to the point of failure or the elongation (200%) given in the corresponding standard. After stretching, the specimen is inspected for any loss of adhesion force or cracking at the specified magnification (to 6 times). The 2 mm length of the ends of the broken wires shall be neglected.

Three specimens are tested. When the cracks and/or loss of adhesion force are shown in the electric wire, this fact is recorded.

TABLE 3

|  |  | tan δ (° C.) | Degree of softening resistance (° C.) | BDV (kV) | Number of pinholes (ea) | Number of cracks after pulling (ea) |
|---|---|---|---|---|---|---|
| Example | 1 | 310 | 549 | 10.1 | 0 | 0 |
|  | 2 | 340 | 568 | 10.3 | 0 | 0 |
|  | 3 | 283 | 536 | 9.2 | 0 | 0 |
|  | 4 | 277 | 530 | 8.9 | 1 | 0 |
|  | 5 | 301 | 532 | 9.4 | 0 | 0 |
|  | 6 | 302 | 540 | 9.1 | 0 | 0 |
|  | 7 | 295 | 535 | 9.3 | 0 | 0 |
|  | 8 | 290 | 534 | 9.3 | 0 | 0 |
|  | 9 | 265 | 527 | 8.6 | 1 | 1 |
|  | 10 | 258 | 525 | 8.2 | 1 | 1 |
| Comparative Example | 1 | 235 | 470 | 6.4 | 10 | 3 |
|  | 2 | 240 | 481 | 6.8 | 8 | 3 |
|  | 3 | 244 | 492 | 7.3 | 6 | 2 |
|  | 4 | 230 | 464 | 7.2 | 8 | 4 |
|  | 5 | 237 | 465 | 6.9 | 12 | 3 |
|  | 6 | 245 | 500 | 7.7 | 7 | 10 |
|  | 7 | 246 | 506 | 7.2 | 7 | 10 |
|  | 8 | 243 | 503 | 7.3 | 12 | 12 |
|  | 9 | 245 | 510 | 6.8 | 10 | 12 |
|  | 10 | 241 | 495 | 7.3 | 2 | 1 |
|  | 11 | 240 | 476 | 7.1 | 3 | 1 |
|  | 12 | 233 | 482 | 6.8 | 0 | 0 |
|  | 13 | 273 | 515 | 7.8 | 0 | 0 |
|  | 14 | 260 | 505 | 7.3 | 0 | 0 |

Referring to Table 3, the polyimide coated materials of Examples 1 to 10 prepared from the polyimide varnishes containing the PMA, antioxidant, silicone-based additive and alkoxy silane coupling agent according to the present invention have tan δ of 250° C. or higher and a degree of softening resistance of 520° C. or higher, thereby having excellent heat resistance, and have a breakdown voltage of 8 kV/mm or higher, thereby having excellent insulation properties, and it can be confirmed that they have excellent adhesion force between the conductor and the coating through the pull test.

On the other hand, in the case of Comparative Examples 1 to 14 having differences from the Examples in the PMA, antioxidant, silicone-based additive and alkoxysilane coupling agent, and the solid content, the viscosity, and the maximum temperature of the curing furnace, at least one or more of the tan δ, degree of softening resistance or breakdown voltage has been lowered as compared to Examples, and it can be confirmed that there are a relatively large number of pinholes according to the pinhole test, that is, defects of the insulator.

Also, in the case of some comparative examples, in particular, Comparative Examples 6 to 9 in which the silicone-based additive or the alkoxy silane coupling agent is included so as to deviate from the scope of the present invention, a number of cracks have been observed on the outer surfaces of the polyimide coated materials in the pull test, so that it can be confirmed that the adhesion force between the conductor and the coated material has been lowered.

Furthermore, in the case of the polyimide coated materials of Comparative Examples 12 to 14 prepared from the polyimide varnishes in which an antioxidant is not added or an antioxidant having a 5 wt % decomposition temperature of 380° C. or lower is added, at least one or more of the tan δ, degree of softening resistance or breakdown voltage has been lowered, whereby it can be predicted to result in decomposition of the antioxidant at high temperatures during the manufacturing process of the polyimide coated materials.

Although the above description has been made with reference to the examples of the present invention, those having ordinary knowledge in the field to which the present invention belongs will be able to perform various applications and modifications within the scope of the present invention based on the above contents.

INDUSTRIAL APPLICABILITY

The polyimide varnish according to the present invention comprises an aromatic carboxylic acid having four or more carboxyl groups, whereby the process handleability is good due to the low viscosity in the process of coating the polyimide varnish, and the length of the polymer chain is increased in the curing process after coating, so that it is possible to secure heat resistance, insulation properties, flexibility and adhesion with a base material which are similar to those of the polyimide coated material made from the polyamic acid having a higher molecular weight.

In addition, the alkoxy silane coupling agent and the silicone-based additive included in the polyimide varnish may improve the adhesion force between the polyimide coated material and the conductor, thereby improving production yields.

Furthermore, since the antioxidant having a 5 wt % decomposition temperature of 380° C. or higher contained in the polyimide varnish has low volatility and excellent thermal stability, it is not decomposed or volatilized during the manufacturing process of the polyimide coated material, whereby the oxidation of the amide group in the polyimide varnish or the imide group of the polyimide coated material can be prevented, and accordingly, can minimize changes in physical properties of the polyimide coated material.

Such a polyimide coated material has the advantage of satisfying heat resistance, insulation properties and flexibility required for electronic devices.

The invention claimed is:
1. A polyimide varnish for conductor coating,
the polyimide varnish comprising: a polyamic acid solution prepared through polymerization of at least one dianhydride monomer and at least one diamine monomer in an organic solvent;
an aromatic carboxylic acid having four or more carboxyl groups;
an alkoxy silane coupling agent; and
an antioxidant,
wherein the polyimide varnish has a solid content of 15 to 38 wt % on the basis of the total weight thereof, and
a viscosity at 23° C. of 500 to 9.000 cP, and
the coated material prepared from the polyimide varnish has a degree of softening resistance of 520° C. or higher, and a breakdown voltage (BDV) of 8 kV/mm or higher.
2. The polyimide varnish according to claim 1,
wherein the aromatic carboxylic acid comprises one or more selected from the group consisting of pyromellitic acid (PMA), 3,3',4,4'-biphenyltetracarboxylic acid (BPTA), 1,2,3,4-benzenetetracarboxylic acid, benzophenone-3,3',4,4'-tetracarboxylic acid, pyrazinetetracarboxylic acid, 2,3,6,7-naphthalenetetracarboxylic acid and naphthalene-1,4,5,8-tetracarboxylic acid.
3. The polyimide varnish according to claim 1,
wherein an input of the dianhydride monomer is 80 to 99.9 mol % and an input of the aromatic carboxylic acid is 0.1 to 20 mol %, based on 100 mol % of the diamine monomer.

4. The polyimide varnish according to claim 1,
wherein the polyimide varnish comprises 0.01 to 0.05 parts by weight of an alkoxy silane coupling agent relative to 100 parts by weight of the solid content of the polyimide varnish.

5. The polyimide varnish according to claim 4,
wherein the alkoxy silane coupling agent comprises one or more selected from the group consisting of 3-aminopropyl trimethoxysilane, 3-aminopropyl triethoxysilane, 3-aminopropyl methyl dimethoxysilane, 3-aminopropyl methyl diethoxysilane, 3-(2-aminoethyl) aminopropyl trimethoxysilane, 3-phenylaminopropyl trimethoxysilane, 2-aminophenyl trimethoxysilane, and 3-aminophenyl trimethoxysilane.

6. The polyimide varnish according to claim 1,
wherein the polyimide varnish further comprises a silicone-based additive.

7. The polyimide varnish according to claim 6,
wherein the polyimide varnish comprises 0.01 to 0.05 parts by weight of a silicone-based additive relative to 100 parts by weight of the solid content of the polyimide varnish.

8. The polyimide varnish according to claim 6,
wherein the silicone-based additive comprises one or more selected from the group consisting of dimethylpolysiloxane, polyether modified polydimethysiloxane, polymethylalkylsiloxane, and a silicone-based compound containing a hydroxyl group (—OH) and a double bond structure (C═C).

9. The polyimide varnish according to claim 1,
wherein the antioxidant has a 5 wt % decomposition temperature of 380° C. or higher.

10. The polyimide varnish according to claim 1,
wherein the antioxidant has a 5 wt % decomposition temperature of 400° C. or higher.

11. The polyimide varnish according to claim 1,
wherein the antioxidant comprises a compound represented by the following formula

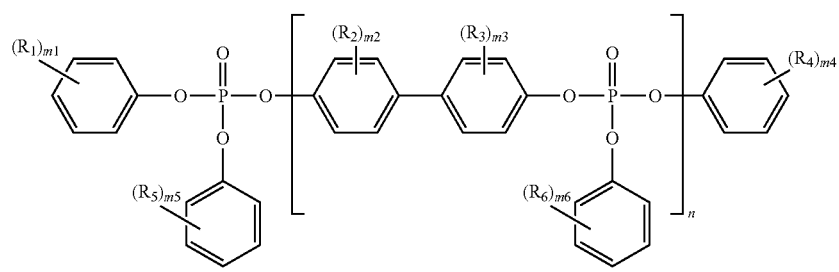

wherein, $R_1$ to $R_6$ may each independently be selected from the group consisting of a C1-C3 alkyl group, an aryl group, a carboxylic acid group, a hydroxy group, a fluoroalkyl group and a sulfonic acid group,
n is an integer of 1 to 4,
when $R_1$ to $R_6$ are in plural, they may be the same or different from each other, and
m1 to m6 are each independently an integer of 0 to 3.

12. The polyimide varnish according to claim 11,
wherein in Formula 1 above, n is 1, and m1 to m6 are 0.

13. The polyimide varnish according to claim 1,
wherein the polyimide varnish comprises 0.1 to 2 parts by weight of an antioxidant relative to 100 parts by weight of the solid content of the polyimide varnish.

14. A method for producing a polyimide varnish according to claim 1, comprising processes of:
(a) polymerizing at least one dianhydride monomer and at least one diamine monomer in an organic solvent to prepare a polyamic acid solution;
(b) mixing an alkoxy silane coupling agent and an antioxidant in the polyamic acid solution to prepare a mixture; and
(c) mixing the mixture and an aromatic carboxylic acid having four or more carboxyl groups.

15. The method for producing a polyimide varnish according to claim 14,
wherein the process (a) is performed at 30 to 80° C., and
the polyamic acid solution has a viscosity at 23° C. in a range of 500 to 9,000 cP,
in the process (b), a silicone-based additive is additionally mixed to the polyamic acid solution, and the process (b) is performed at 40 to 90° C., and
the process (c) is performed at 40 to 90° C.

16. A method for producing a polyimide coated material, comprising processes of:
(1) coating the polyimide varnish according to claim 1 on a conductor surface; and
(2) imidizing the polyimide varnish coated on the conductor surface,
wherein the processes (1) and (2) are continuously repeated 4 to 20 times and performed.

17. The method for producing a polyimide coated material according to claim 16,
wherein the thickness that the polyimide varnish is coated per repeat performance of the processes (1) and (2) is 2 to 6 μm,
the process (2) is performed at 300 to 750° C., and
the coating speed of the conductor is 2 to 30 m/min.

18. The method for producing a polyimide coated material according to claim 16,
wherein the conductor is an electric wire having a diameter of 0.1 to 5 mm.

19. A polyimide coated material prepared by the method for producing a polyimide coated material according to claim 16.

20. The polyimide coated material according to claim 19,
wherein the polyimide coated material has a thickness in a range of 16 to 50 μm, and tan δ of 250° C. or higher.

21. An electric wire comprising a polyimide coated material prepared by coating and imidizing the polyimide varnish according to claim 1 on the electric wire surface.

22. An electronic device comprising the electric wire according to claim 21.

\* \* \* \* \*